UNITED STATES PATENT OFFICE 2,481,698

THIOKETONES AND PROCESS FOR PREPARING THE SAME

Robert H. Sprague, Rochester, N. Y., assignor to Eastman Kodak Company, Rochester, N. Y., a corporation of New Jersey No Drawing. Application February 24, 1947, Serial No. 730,564

12 Claims. (Cl. 260—298)

This invention relates to thioketones, to anhydro-meso-substituted carbocyanine hydroxides and to a process for preparing them. This invention also relates to alkylmercapto compounds prepared from the said thioketones.

I have found that thioketones and anhydro-meso-substituted carbocyanine hydroxides are simultaneously formed when a cyclammonium carboxyalkyl quaternary salt containing a reactive alkyl group is condensed with an ester of a dithiocarboxylic acid. The thioketones are new compounds as are the alkylmercapto compounds obtained therefrom by treatment with alkyl salts.

It is, accordingly, an object of my invention to provide new thioketones, alkylmercapto compounds and anhydro-meso-substituted carbocyanine hydroxides. A further object is to provide a process for the simultaneous preparation of these compounds. Other objects will become apparent hereinafter.

In accordance with my invention, I condense a cyclammonium carboxyalkyl quaternary salt selected from those represented by the following general formula:

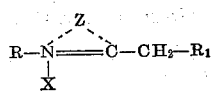

wherein R represents a carboxyalkyl group, e. g. carboxymethyl, β-carboxyethyl, α-carboxyethyl, γ-carboxypropyl, α, γ-dicarboxypropyl, etc., X represents an anion, e. g. chloride, bromide, iodide, perchlorate, acetate, propionate, thiocyanate, etc., $R_1$ represents a hydrogen atom or a methyl group, and Z represents the non-metallic atoms necessary to complete a heterocyclic nucleus especially one of the benzothiazole series, the benzoselenazole series or the α-naphthothiazole series, with an ester of a dithiocarboxylic acid, especially an ester containing from 3 to 14 carbon atoms, i. e. an ester selected from those represented by the following general formula:

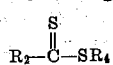

wherein $R_2$ represents a hydrocarbon radical containing from 1 to 6 carbon atoms, e. g. methyl, ethyl, cyclohexyl, phenyl, etc. and $R_4$ represents an alcohol radical containing from 1 to 7 carbon atoms, e. g. methyl, ethyl, n-propyl, n-butyl, benzyl, etc.

Advantageously the condensations are carried out in the presence of a basic condensing agent. As basic condensing agents, organic tertiary amines are advantageously employed, e. g. trialkylamines (e. g. triethylamine, tri-n-butylamine, triethanolamine, triisoamylamine, N-methylpiperidine, N-ethylpiperidine, dimethylaniline, etc.). Advantageously the condensations are carried out in pyridine containing a trialkylamine. As esters of dithiocarboxylic acids, methyl dithioacetate, ethyl dithioacetate, methyl dithiopropionate, ethyl dithiopropionate, butyl dithioacetate, methyl dithiobenzoate, ethyl dithiobenzoate, benzyl dithiobenzoate, methyl dithiocyclohexanecarboxylate, etc. are exemplary. As cyclammonium carboxyalkyl quaternary salts the following are advantageously employed: 2-methylbenzothiazole β-carboxyethiodide, 2,4-dimethylbenzothiazole β-carboxyethiodide, 2,5-dimethylbenzothiazole β-carboxyethiodide, 2,6-dimethylbenzothiazole β-carboxyethiodide, 4-chloro-2-methylbenzothiazole carboxymethobromide, 5-chloro-2-methylbenzothiazole carboxymethobromide, 6-chloro-2-methylbenzothiazole β-carboxyethiodide, 4-methoxy-2-methylbenzothiazole β-carboxyethochloride, 5-methoxy-2-methylbenzothiazole β-carboxyethiodide, 6-methoxy-2-methylbenzothiazole α-carboxyethobromide, 2-methylbenzoselenazole carboxymethobromide, 5-chloro-2-methylbenzoselenazole β-carboxyethiodide, 2-methyl-α-naphthothiazole carboxymethobromide, 2-methyl-α-naphthothiazole β-carboxyethiodide, 2-ethylbenzothiazole β-carboxyethiodide, etc.

The following examples will serve to illustrate further the manner of practicing my invention.

*Example 1.—3-β-carboxyethyl-2-thioacetylmethylenebenzothiazoline*

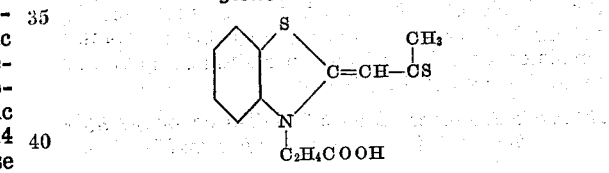

17.5 g (1 mol.) of 2-methylbenzothiazole-β-carboxyethiodide, 5.3 g. (1 mol.) of methyldithioacetate, 5.0 g. (1 mol.) of triethylamine and 50 cc. of pyridine were boiled together under reflux for 30 minutes. The reaction mixture became red in color and much solid separated out of the boiling solution. The mixture was cooled to room temperature, poured into 600 cc. of 10 per cent acetic acid and chilled to 0° C. with stirring. The solid product was collected on a filter and washed on the filter with water. The crude product was extracted with 300 cc. of hot methyl alcohol. An insoluble residue of red crystals weighing 5.0 g. was obtained and was identified as detailed below. The alcohol solution was chilled to 0° C., the crystals collected on a filter, washed on the filter with alcohol and dried. The yield of red crystals was 4.4 g., 31 per cent. After recrystallization from absolute ethyl alcohol (160 cc. per gram) the product was obtained as red crystals which melted at 194°–196° C. with decomposition. The yield of purified material was 24 per cent. The thioketone is a sensitizer from 470 to 510 mμ for a gelatino-silver-chlorobromo-iodide emulsion.

*Example 1a.—Anhydro - 3,3' - di-β-carboxyethyl-9-methylthiacarbocyanine hydroxide*

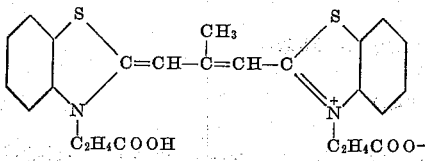

The insoluble red crystals obtained in Example 1 were purified by dissolving in hot methyl alcohol containing an excess of triethylamine beyond that required to form the salt of the dye. The hot solution was filtered and the dye precipitated from the cooled solution by addition of acetic acid. The dye was obtained as dull purple crystals which melted with decomposition at 218°–222° C. The yield of purified material was 4.2 g., 36 per cent. The dye is a sensitizer from 500 to 640 mμ with maxima at 540 and 600 mμ in a gelatino-silver-bromoiodide emulsion.

*Example 2.—3-β-carboxyethyl - 2 - thiopropionyl-methylenebenzothiazoline*

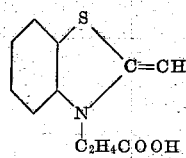

17.5 g. (1 mol.) of 2-methylbenzothiazole β-carboxyethiodide, 6.0 g. (1 mol.) of methyldithiopropionate, 5.6 g. (1 mol.) of triethylamine and 80 cc. of pyridine were boiled together under reflux for 30 minutes. The product was separated from an insoluble by-product in the same manner as the preceding example. The yield of bright red crystals was 4.8 g., 33 per cent. After recrystallization from absolute ethyl alcohol (30 cc. per gram) the product melted with decomposition at 194–195° C. The yield of purified material was 3.0 g., 26 per cent. The thioketone is a sensitizer for a gelatino-silver-bromoiodide emulsion to 500 mμ the insoluble fraction of the crude product consisted of 8.7 g. of purple crystals. This was identified as detailed below.

*Example 2a.—Anhydro - 3,3' - di-β-carboxyethyl-9-ethylthiacarbocyanine hydroxide*

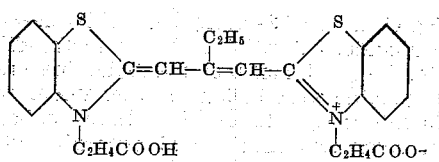

The 8.7 g. (72 per cent crude yield) of purple crystals obtained above were purified in the same manner as Example 1a. The purified dye was obtained as minute green crystals which melted with decomposition at 171–173° C. The yield of purified material was 7.0 g., 58 per cent. The dye is a sensitizer from 500 to 650 mμ with a maximum at 630 mμ in a bromoiodide emulsion.

*Example 3.—3 - β-carboxyethyl-5-chloro-2-thiopropionylmethylene-benzothiazoline and anhydro-5,5' - dichloro-3,3'-di - β - carboxyethyl-9-ethylthiacarbocyanine hydroxide*

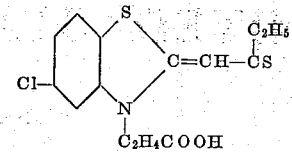

19.2 g. (1 mol.) of 5-chloro-2-methylbenzothiazole β-carboxyethiodide, 6.0 g. (1 mol.) of methyldithiopropionate, 5.0 g. (1 mol.) of triethylamine and 50 cc. of pyridine were boiled together under reflux for 30 minutes. The product was isolated in the same manner as Example 1. The yield of brown crystals was 3.0 g., 18 per cent. After recrystallization from absolute ethyl alcohol (60 cc. per gram) the product melted at 210–212° C. with decomposition. The yield of purified material was 2.1 g., 15 per cent. The thioketone is a sensitizer, to 500 mμ in a gelatino-silver chlorobromoiodide emulsion. A quantity of insoluble red solid was also obtained from the above reaction mixture. This was dissolved in 800 cc. of methyl alcohol plus 2 cc. of piperidine, filtered and the dye precipitated by the addition of 10 cc. of glacial acetic acid. The yield of brownish crystals was 4.1 g., 32 per cent. The dye melted at 195–197° C. with decomposition. The formula of the dye is as follows:

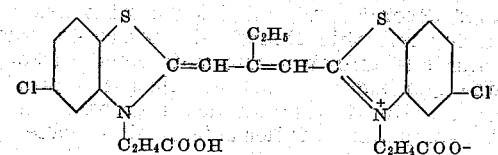

The dye is a sensitizer from 500 to 660 mμ with a maximum at 640 mμ in a gelatino-silver-bromoiodide emulsion.

*Example 4.—3-β-carboxyethyl-5-chloro-2-thioacetylmethylenebenzothiazoline*

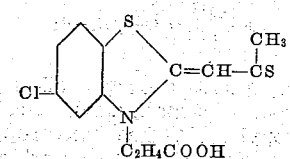

38.35 g. (1 mol.) of 5-chloro-2-methylbenzothiazole-β-carboxyethiodide, 10.6 g. (1 mol.) of methyldithioacetate, 10.0 g. (1 mol.) of triethylamine and 100 cc. of pyridine were boiled together under reflux for 15 minutes. The product was separated from a quantity of insoluble purple dye which occurs as a by-product in the same manner as in Example 1. The yield of brown crystals was 8.0 g., 25 per cent. After recrystallization from methyl alcohol (100 cc. per gram) the product melted with decomposition at 222–224° C. The yield of purified material was 15 per cent. The thioketone had no sensitizing action in a gelatino-silver-chlorobromoiodide emulsion.

*Example 5.—3-carboxymethyl-5-chloro-2-thiopropionylmethylene benzothiazoline*

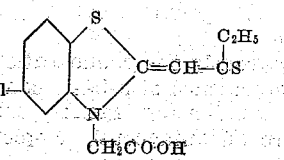

16.1 g. (1 mol.) of 5-chloro-2-methylbenzothiazole carboxymethobromide, 6.0 g. (1 mol.) of methyldithiopropionate, 5.0 g. (1 mol.) of triethylamine and 50 cc. of pyridine were boiled together under reflux for 30 minutes. The product was extracted from an insoluble by-product in the same manner as Example 1. The yield of brown crystals was 1.2 g., 8 per cent. After recrystallization from absolute ethyl alcohol (50 cc. per gram) the product melted with decomposition at 190–192° C. The yield of purified material was .8 g., 5 per cent. The thioketone is a sensitizer to 510 m$\mu$ in a gelatino-silver-chlorobromoiodide emulsion.

*Example 5a.—Anhydro - 3,3' - dicarboxymethyl-5,5'-dichloro-9-ethylthiacarbocyanine hydroxide*

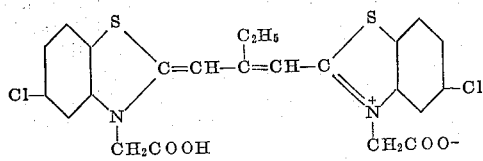

The insoluble product obtained above was purified in the same manner as Example 2a. The purified dye was obtained as dull red crystals which melted at 198–200° C. with decomposition. The yield of purified material was 2.4 g., 17 per cent. The dye is a sensitizer to 620 m$\mu$ in a gelatino-silver-bromoiodide emulsion.

*Example 6.—3-β-carboxyethyl-2-thioacetylmethylenebenzoselenazoline*

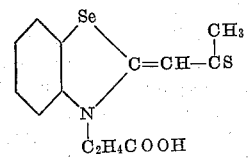

19.8 g. (1 mol.) of 2-methylbenzoselenazole-β-carboxyethiodide, 5.3 g. (1 mol.) of methyldithioacetate, 5.0 g. (1 mol.) of triethylamine and 50 cc. of pyridine were boiled together under reflux for 10 minutes. The product was separated from an insoluble by-product in the same manner as Example 1. The yield of brown crystals was 3.8 g., 23 per cent. After recrystallization from absolute ethyl alcohol (50 cc. per gram) the product melted with decomposition at 198–200° C. The yield of purified material was 2.85 g., 17 per cent. The thioketone is a sensitizer to 610 m$\mu$ with maxima at 520 and 600 m$\mu$ in a gelatino-silver-chlorobromoiodide emulsion.

*Example 6a.—Anhydro-3,3'-di-β-carboxyethyl-9-methylselenacarbocyanine hydroxide*

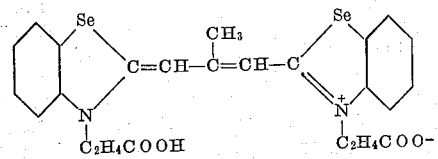

The insoluble product obtained above was purified by dissolving in 200 cc. of methyl alcohol containing 10 cc. of water and 1 cc. of piperidine. The solution was filtered and the dye precipitated by addition of glacial acetic acid. The yield of purified material was 2.9 g., 21 per cent. The dye was obtained as dull red crystals which melted with decomposition at 203–205° C. The dye is a sensitizer from 500 to 650 m$\mu$ with maxima at 520 and 600 m$\mu$ in a gelatino-silver-bromoiodide emulsion.

*Example 7.—3-β-carboxyethyl-2-thioacetylmethylene-α-naphthothiazoline*

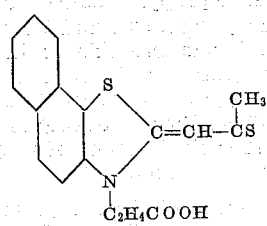

19.95 g. (1 mol.) of 2-methyl-α-naphthothiazole β-carboxyethiodide, 5.3 g. (1 mol.) of methyldithioacetate, 5.0 g. (1 mol.) of triethylamine and 50 cc. of pyridine were boiled together under reflux for 10 minutes. The product was separated from an insoluble by-product in the same manner as Example 1. The yield of brown crystals was 2.5 g., 15 per cent. After recrystallization from methyl alcohol (120 cc. per gram) the product melted with decomposition at 200–202° C. The yield of purified product was 1.75 g., 11 per cent. The thioketone is a sensitizer with a maximum at 610 m$\mu$ in a gelatino-silver-chlorobromoiodide emulsion.

*Example 7a.—Anhydro-3,3'-di-β-carboxyethyl-9-methyl-6,7,6',7'-dibenzothiacarbocyanine hydroxide*

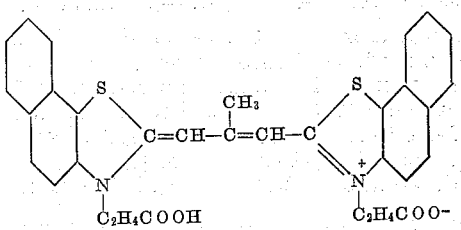

The insoluble product obtained above was purified in the same manner as Example 6a. The dye was obtained as dark red crystals which melted with decomposition at 188–190° C. The yield of purified material was 6.2 g., 44 per cent. The dye is a sensitizer from 500 to 650 m$\mu$ with a maximum at 620 m$\mu$ in a gelatino-silver-bromoiodide emulsion.

The carboxyalkyl quaternary salts employed in practicing my invention are known substances and can be prepared according to United States Patent 2,231,658, dated February 11, 1941, e. g. by reacting the appropriate heterocyclic nitrogen base with halogenated fatty acids. The carboxyalkyl quaternary salts can also be prepared by hydrolysis of the corresponding carbalkoxyalkyl quaternary salts, the preparation of which is also described in the aforesaid United States patent.

The new thioketones obtained in accordance with my invention can be represented by the following general formula:

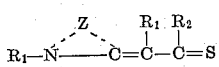

wherein R, R$_1$, R$_2$ and Z have the values recited above.

The thioketones obtained in accordance with my invention can be treated with alkyl salts to yield alkylmercapto compounds represented by the following general formula:

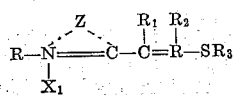

wherein R, R₁, R₂ and Z have the values given above, and R₃ represents an alkyl group, e. g. methyl, ethyl, n-propyl, isobutyl, n-butyl, allyl, benzyl, β-ethoxyethyl, etc. and X₁ represents an anion, e. g. chloride, bromide, iodide, p-toluenesulfonate, benzenesulfonate, methylsulfate, ethylsulfate, acetate, propionate, perchlorate, thiocyanate, etc. The following examples will serve to illustrate further the manner of preparing these alkylmercapto compounds.

*Example 8.—2-(2-methylmercaptopropenyl)benzothiazole β-carboxyetho-p-toluenesulfonate*

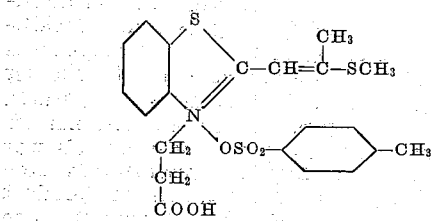

1.4 g. (1 mol.) of 3-β-carboxyethyl-2-thioacetylmethylene-benzothiazoline and 0.9 g. of methyl-p-toluenesulfonate were heated on a steam bath for 30 minutes. A fused mass of 2-(2-methylmercaptopropenyl)benzothiazole β-carboxyetho-p-toluenesulfonate was formed.

*Example 9.—2-(2-methylmercapto-1-butenyl) benzothiazole β-carboxyetho-p-toluenesulfonate*

1.45 g. (1 mol.) of 3-β-carboxyethyl-2-thiopropionyl-methylenebenzothiazoline and 0.9 g. (1 mol.) of methyl-p-toluenesulfonate were heated on a steam bath for one hour. The red solid 2-(2-methylmercapto-1-butenyl)benzothiazole β-carboxyetho-p-toluenesulfonate was washed by decantation with 25 cc. of diethyl ether.

*Example 10.—5-chloro-2-(2-methylmercapto-1-butenyl)benzothiazole β-carboxyetho-p-toluenesulfonate*

1.1 g. (1 mol.) of 3-β-carboxyethyl-5-chloro-2-chloro-2-thiopropionylmethylenebenzothiazoline and 0.5 g. (1 mol.) of methyl-p-toluenesulfonate were heated together on the steam bath for 30 minutes. A fused mass of 5-chloro-2-(2-methylmercapto-1-butenyl)-benzothiazole β-carboxyetho-p-toluenesulfonate was formed.

*Example 11.—5-chloro-2-(2-methylmercaptopropenyl)benzothiazole β-carboxyetho-p-toluenesulfonate*

1.6 g. (1 mol.) of 3-β-carboxyethyl-5-chloro-2-thioacetylmethylenebenzothiazoline and 1.9 g. (2 mols.) of methyl-p-toluenesulfonate were heated on a steam bath for 90 minutes. A fused mass of 5-chloro-2-(2-methylmercaptopropenyl)benzothiazole β-carboxyetho-p-toluenesulfonate.

In the same manner shown in Examples 9 to 12, other alkyl salts, e. g. dimethyl sulfate, diethyl sulfate, n-propyl bromide, isobutyl iodide, methyl benzenesulfonate, ethyl p-toluenesulfonate, etc. can be added to the thioketones. The more soluble alkylmercapto quaternary salts, e. g. the benzenesulfonates, the p-toluenesulfonates, the methylsulfates, the ethylsulfates, etc. can be converted to the less soluble bromides, iodides or perchlorates by treatment of a hot methyl alcoholic solution of the more soluble quaternary salt with a concentrated aqueous solution of potassium bromide, potassium iodide or sodium perchlorate, chilling the resulting mixture if necessary to precipitate the less soluble alkylmercapto quaternary bromide, iodide or perchlorate. Alkylmercapto quaternary chlorides or thiocyanates can be made from the alkylmercapto quaternary iodides by boiling the quaternary iodides with a methyl alcoholic suspension of silver chloride or silver thiocyanate, filtering off the silver salts and recovering the alkylmercapto quaternary chloride or thiocyanate from the methyl alcohol by concentration and chilling. Alkylmercapto quaternary acetates can be similarly prepared from quaternary iodides, using silver acetate.

As shown in the foregoing Examples 1 to 7, some of the thioketones of my invention and the anhydro-meso-substituted carbocyanine hydroxides of my invention sensitize photographic silver halide emulsions. Sensitization by means of the herein-described thioketones or anhydro-meso-substituted carbocyanine hydroxides is primarily directed to the ordinarily employed gelatino-silver-halide developing-out emulsions. The compounds are advantageously incorporated in the washed, finished emulsions and should, of course, be uniformly distributed throughout the emulsions.

The concentration of these compounds in the emulsion can vary widely, i. e. from about 5 to about 100 mg. per liter of flowable emulsions. The concentration of the compound will vary according to the type of light-sensitive material in the emulsion and according to the effect desired. The suitable and most economical concentration for any given emulsion will be apparent to those skilled in the art upon making the ordinary tests and observations customarily used in the art of emulsion making.

To prepare a gelatino-silver-halide emulsion sensitized with one of these compounds, the following procedure is satisfactory. A quantity of the compound is dissolved in methyl alcohol or other suitable solvent, and a volume of this solution (which may be diluted with water) containing from 5 to 100 mg. of compound is slowly added to about 1,000 cc. of gelatino-silver-halide emulsion with stirring. Stirring is continued until the compound is uniformly distributed throughout the emulsion. With most of my new sensitizing compounds, 10 to 20 mg. of compound per liter of emulsion suffices to produce the maximum sensitizing effect with the ordinary gelatino-silver-bromiodide emulsions.

The above statements are only illustrative and are not to be understood as limiting my invention, as it will be apparent that these compounds can be incorporated by other methods in any of the photographic silver-halide emulsions customarily employed in the art. For instance, the compounds may be incorporated by bathing a plate or film upon which an emulsion has been coated in a solution of the compound in an appropriate solvent. Bathing methods, however, are not to be preferred ordinarily.

What I claim as my invention and desire to be secured by Letters Patent of the United States is:

1. A process for simultaneously preparing a thioketone and an anhydro-meso-substituted carbocyanine hydroxide comprising condensing a cyclammonium carboxyalkyl quaternary salt selected from those represented by the following general formula:

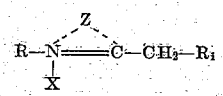

wherein R represents a carboxyalkyl group containing from 2 to 5 carbon atoms, X represents on anion, $R_1$ represents a member selected from the group consisting of a hydrogen atom and a methyl group, and Z represents the non-metallic atoms necessary to complete a heterocyclic nucleus selected from the group consisting of those of the benzothiazole series, those of the benzoselenazole series and those of the α-naphthothiazole series, with an ester of a dithiocarboxylic acid selected from those represented by the following general formula:

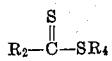

wherein $R_2$ represents a hydrocarbon radical containing from 1 to 6 carbon atoms and $R_4$ represents an alkyl group containing from 1 to 7 carbon atoms, in the presence of a basic tertiary organic amine condensing agent, and separating the thioketone from the anhydro-meso-substituted carbocyanine hydroxide.

2. A process for simultaneously preparing a thioketone and an anhydro-meso-substituted carbocyanine hydroxide comprising condensing a cyclammonium carboxyalkyl quaternary salt selected from those represented by the following general formula:

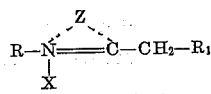

wherein R represents a carboxyalkyl group containing from 2 to 5 carbon atoms, X represents an anion, $R_1$ represents a member selected from the group consisting of a hydrogen atom and a methyl group, and Z represents the non-metallic atoms necessary to complete a heterocyclic nucleus selected from the group consisting of those of the benzothiazole series, those of the benzoselenazole series and those of the α-naphthothiazole series, with an ester of a dithiocarboxylic acid, selected from those represented by the following general formula:

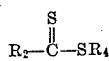

wherein $R_2$ represents a hydrocarbon radical containing from 1 to 6 carbon atoms and $R_4$ represents an alkyl group containing from 1 to 7 carbon atoms, in the presence of pyridine and a trialkylamine containing from 6 to 15 carbon atoms, and separating the thioketone from the anhydro-meso-substituted carbocyanine hydroxide.

3. A process for simultaneously preparing a thioketone and an anhydro-meso-substituted carbocyanine hydroxide comprising condensing a carboxyalkyl quaternary salt of the benzothiazole series containing a methyl group in the 2-position and containing from 2 to 3 carbon atoms in the carboxyalkyl group, with an ester of a dithiocarboxylic acid selected from those represented by the following general formula:

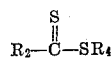

wherein $R_2$ and $R_4$ each represents a saturated hydrocarbon radical containing from 1 to 2 carbon atoms, in the presence of pyridine and a trialkylamine containing from 6 to 15 carbon atoms and separating the thioketone from the anhydro-meso-substituted carbocyanine hydroxide.

4. A process for simultaneously preparing a thioketone and an anhydro-meso-substituted carbocyanine hydroxide comprising condensing a carboxyalkyl quaternary salt of the benzoselenazole series containing a methyl group in the 2-position and containing from 2 to 3 carbon atoms in the carboxyalkyl group, with an ester of a dithiocarboxylic acid selected from those represented by the following general formula:

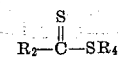

wherein $R_2$ and $R_4$ each represents a saturated hydrocarbon radical containing from 1 to 2 carbon atoms, in the presence of pyridine and a trialkylamine containing from 6 to 15 carbon atoms and separating the thioketone from the anhydro-meso-substituted carbocyanine hydroxide.

5. A process for simultaneously preparing a thioketone and an anhydro-meso-substituted carbocyanine hydroxide comprising condensing a carboxyalkyl quaternary salt of the α-naphthothiazole series containing a methyl group in the 2-position and containing from 2 to 3 carbon atoms in the carboxyalkyl group, with an ester of a dithiocarboxylic acid selected from those represented by the following general formula:

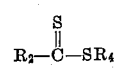

wherein $R_2$ and $R_4$ each represents a saturated hydrocarbon radical containing from 1 to 2 carbon atoms, in the presence of pyridine and a trialkylamine containing from 6 to 15 carbon atoms and separating the thioketone from the anhydro-meso-substituted carbocyanine hydroxide.

6. A compound selected from the group of compounds which are represented by the following general formulas:

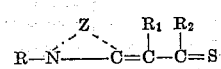

and

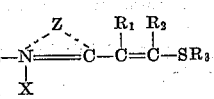

wherein R represents a carboxyalkyl group containing from 2 to 5 carbon atoms, $R_1$ represents a member selected from the group consisting of a hydrogen atom and a methyl group, $R_2$ represents a hydrocarbon radical containing from 1 to 6 carbon atoms, X represents an anion, $R_3$ represents an alkyl group containing from 1 to 7 carbon atoms and Z represents the non-metallic atoms necessary to complete a heterocyclic nucleus selected from the group consisting of those of the benzothiazole series, those of the benzoselenazole series and those of the α-naphthothiazole series.

7. A compound selected from the group of compounds represented by the following general formulas:

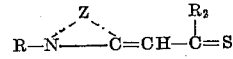

and

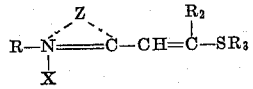

wherein R represents a carboxyalkyl group containing from 2 to 3 carbon atoms, $R_2$ and $R_3$ each represents a primary alkyl group of the formula $C_mH_{2m+1}$ wherein m represents a positive integer of from 1 to 4, X represents an anion and Z represents the non-metallic atoms necessary to complete a heterocyclic nucleus of the benzothiazole series.

8. A compound selected from the group of compounds represented by the following general formulas:

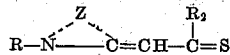

and

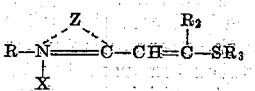

wherein R represents a carboxyalkyl group containing from 2 to 3 carbon atoms, $R_2$ and $R_3$ each represents a primary alkyl group of the formula $C_mH_{2m+1}$ wherein $m$ represents a positive integer of from 1 to 4, X represents an anion and Z represents the non-metallic atoms necessary to complete a heterocyclic nucleus of the α-naphthothiazole series.

9. A compound selected from the group of compounds represented by the following general formulas:

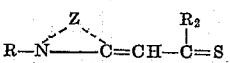

and

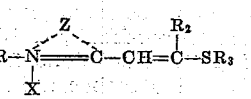

wherein R represents a carboxyalkyl group containing from 2 to 3 carbons atoms, $R_2$ and $R_3$ each represents a primary alkyl group of the formula $C_mH_{2m+1}$ wherein $m$ represents a positive integer of from 1 to 4, X represents an anion and Z represents the nonmetallic atoms necessary to complete a heterocyclic nucleus of the benzoselenazole series.

10. The thioketone which is represented by the following formula:

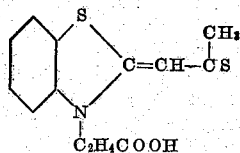

11. The thioketone which is represented by the following formula:

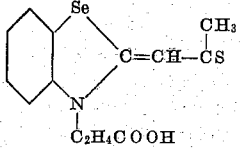

12. The thioketone which is represented by the following formula:

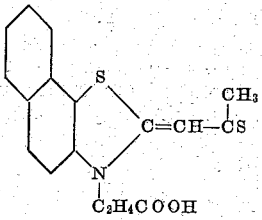

ROBERT H. SPRAGUE.

REFERENCES CITED

The following references are of record in the file of this patent:

UNITED STATES PATENTS

| Number | Name | Date |
| --- | --- | --- |
| 2,231,658 | Brooker et al. | Feb. 11, 1941 |
| 2,315,498 | Brooker et al. | Apr. 6, 1943 |
| 2,332,517 | Kendall | Oct. 26, 1943 |
| 2,354,524 | Kumetat et al. | July 25, 1944 |
| 2,369,646 | Brooker et al. | Feb. 20, 1945 |